United States Patent [19]

Pingelton

[11] Patent Number: 4,730,100
[45] Date of Patent: Mar. 8, 1988

[54] FOOD COOKING AND HEATING APPARATUS

[75] Inventor: John R. Pingelton, Broken Arrow, Okla.

[73] Assignee: Jero Manufacturing, Inc., Tulsa, Okla.

[21] Appl. No.: 935,227

[22] Filed: Nov. 26, 1986

[51] Int. Cl.$^4$ .............................................. H05B 1/02
[52] U.S. Cl. .................................. 219/400; 219/401; 219/386; 219/413
[58] Field of Search ............... 219/400, 401, 385, 386, 219/387, 405, 411, 412, 413, 414, 391; 126/21 A; 99/474, 447; 34/195, 196, 197, 198

[56] References Cited

U.S. PATENT DOCUMENTS

| Re. 31,765 | 12/1984 | Guibert | 219/405 |
|---|---|---|---|
| 2,248,867 | 7/1941 | Hallman | 219/400 |
| 2,408,331 | 9/1946 | Mills | 219/400 |
| 2,784,662 | 3/1957 | Grosz | 219/400 |
| 3,032,028 | 5/1962 | Pearce | 126/21 A |
| 3,467,815 | 9/1969 | Robinson | 219/400 |
| 4,030,476 | 6/1977 | Hock | 219/400 |
| 4,308,853 | 1/1982 | Thirade | 219/391 |
| 4,338,911 | 7/1982 | Smith | 126/21 A |
| 4,512,327 | 4/1985 | Stiegler | 219/400 |

FOREIGN PATENT DOCUMENTS 2400845  7/1975  Fed. Rep. of Germany ........ 99/447

Primary Examiner—E. A. Goldberg
Assistant Examiner—Teresa J. Walberg
Attorney, Agent, or Firm—William S. Dorman

[57] ABSTRACT

A food cooking and heating cabinet including a food holding oven having at least one door for access to the interior thereof, an air heating chamber having an inlet and an outlet, an air heating element within the air heating chamber, an intake passageway to conduct heated air from the outlet of the air heating chamber to the food holding oven, an exhaust passageway to conduct air from the food holding oven to the inlet of the air heating chamber, an air temperature sensor within the air heating chamber, a closed air convection system consisting of a variable speed blower in the air heating chamber for circulating air past the heating element, through the intake passageway, through the food holding oven, through the exhaust passageway and back to the air heating chamber, a control for selecting a desired temperature to be maintained in the food holding oven, and a circuit for comparing the sensed temperature to the selected temperature causing the air heating element to operate and the speed of the blower to increase when a diffference in temperature exists and causing the air heating element to cease and the speed of the blower to decrease when the selected temperature is reached.

7 Claims, 6 Drawing Figures

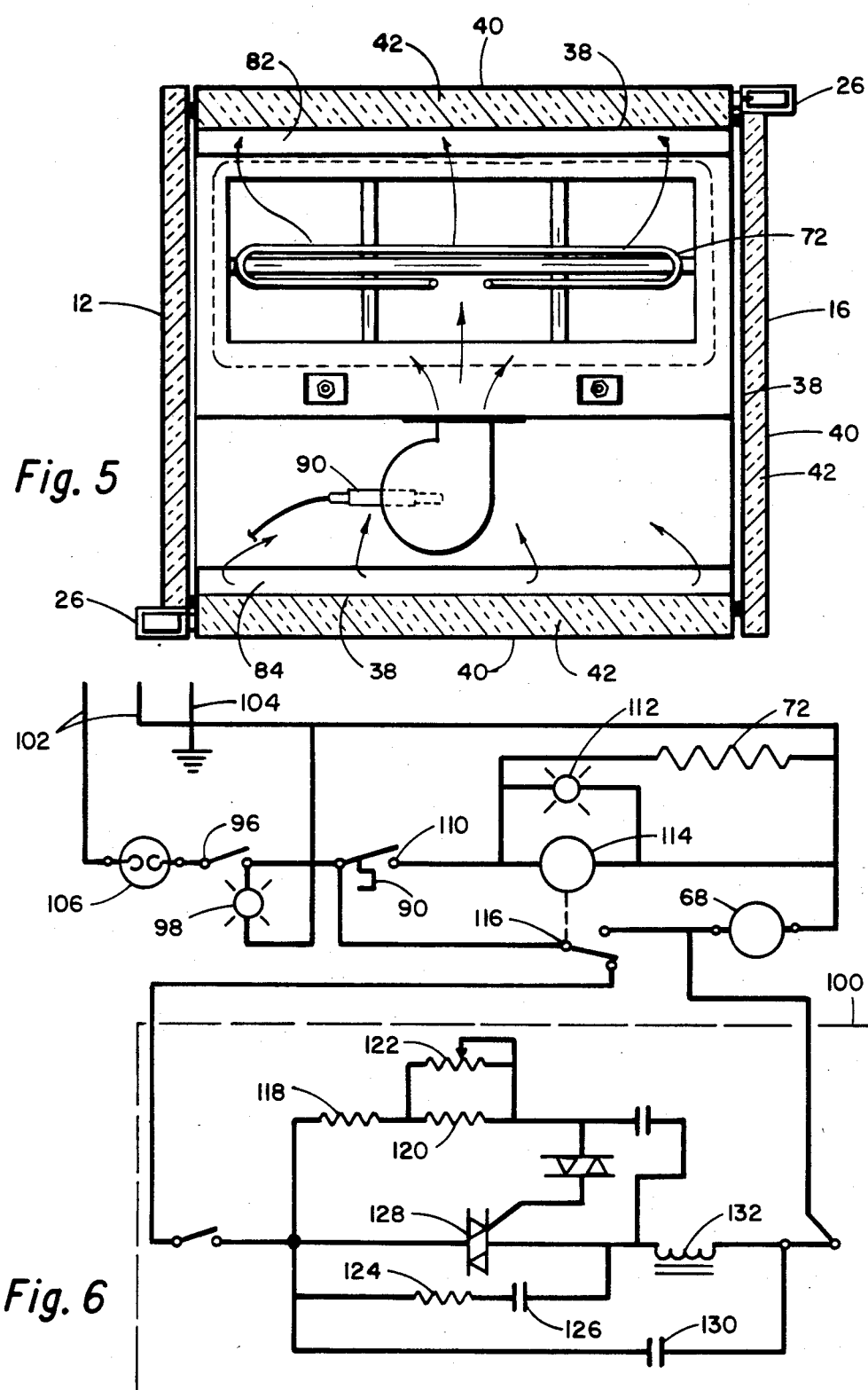

FOOD COOKING AND HEATING APPARATUS

BACKGROUND OF THE INVENTION

1. Field of the Invention

This invention relates to an improved cooking and heating apparatus for food. More particularly, this invention relates to an improved food cooking and heating apparatus which maintains heated food temperature without rapid deterioration of food quality by regulation of the amount of air flow through the apparatus.

2. Description of the Prior Art

Food cooking and heating cabinets are well-known devices used to cook food slowly and used to maintain heated food at serving temperature. Cooking and holding cabinets have become valuable tools in the food industry, particularly in fast food and institutional applications. They allow food to be cooked in advance and then held at the desired serving temperature. The cabinet must be large enough to hold many servings, yet maintain a uniform temperature throughout. The food texture, moisture, color, and flavor must be maintained during the time period the food is held in the cabinet. The most important quality to be maintained is food moisture. This concern is specifically identified in Roderick (U.S. Pat. No. 4,039,776), column 1, lines 18–42.

A patentability search was conducted on the present invention and the following U.S. patents were uncovered in the search:

| U.S. Pat. No. | Patentee | Issue Date |
| --- | --- | --- |
| 4,302,631 | Chesnut et al. | November 24, 1981 |
| 3,868,941 | Roderick | March 4, 1975 |
| 3,955,007 | Roderick | May 4, 1976 |
| 3,999,475 | Roderick | December 28, 1976 |
| 4,036,776 | Roderick | August 2, 1977 |
| 4,062,983 | Roderick | December 13, 1977 |
| 3,634,651 | Siegel et al. | January 11, 1972 |
| 3,737,622 | Hallgreen | June 2, 1971 |
| 238,471 | Woods | March 1, 1881 |
| 3,885,126 | Sugiyama et al. | May 20, 1975 |
| 4,030,476 | Hock | June 21, 1977 |
| 4,208,572 | Melgaard | June 17, 1980 |
| 4,250,955 | Plattner et al. | February 17, 1981 |

Early cooking and heating cabinets utilized radiant heating of the oven. The Roderick patents (U.S. Pat. Nos. 3,868,941 and 3,955,007) are examples of the prior art. A heated outer jacket transfers heat through the oven walls to heat the food therein. The next advance in the art is seen in Roderick (U.S. Pat. No. 4,039,776) where the heated jacket is closed and the air therein recirculated. These approaches suffer two major drawbacks. First, it has been impossible to achieve uniform heat in the larger cabinets presently in use. Second, an unduly long period of time is required to recover the desired temperature after the oven door is opened.

For this reason, it has been found advantageous to circulate heated air through the oven and around the food. In practice, the Roderick U.S. Pat. No. 4,039,776 ovens were modified to provide openings in the oven walls to allow a small portion of heated air to circulate through the oven. Hock (U.S. Pat. No. 4,030,476) shows this approach taken a step further. All of the heated air is circulated through the oven and returned to the heating chamber with the use of a blower. A heating element, used to heat the air in a heating chamber, is controlled by a thermostat and a heat sensitive switch. When the air reaches a desired temperature, the heating element is switched off. Uniform heat and quick temperature recovery may be achieved; food quality, however, is decreased due to drying caused by the heated air passing over and around the food.

One approach is shown in Roderick (U.S. Pat. No. 4,062,983). To avoid the drying effect, heated air is circulated in a food chamber in a circular pattern around the food which is centered at the "eye of the tornado", where air circulation is minimized.

Hock and others have attempted to address the problem of deteriorating food quality by adding moisture back into the air. Hock's water pan is positioned so that the heated air flows over the surface of the water. There are two problems that arise. It is believed that decreasing the drying effect and retaining the natural moisture of food is superior to adding moisture to the atmosphere. Additionally, the water pan requires constant refilling, which is time consuming and is often overlooked by restaurant and institutional attendants.

A further problem can be seen in FIG. 7 of Hock. All of the moist, sometimes grease-laden, air flows past the motor and wiring, leading to breakdowns and required cleaning and repair.

Returning to a consideration of Roderick (U.S. Pat. No. 4,039,776), the heating elements and blowers are activated when the heated air drops below a selected lower temperature. When the heated air reaches the selected temperature, and heating element is deactivated and the blowers continue until the temperature begins to drop.

The present invention is an improvement over the hot food holding cabinets such as shown in Hock. A variable speed blower is combined with circuitry responsive to the temperature in the oven.

Therefore, it is a principal object and purpose of the present invention to maximize food quality in a food cooking and heating apparatus by controlling the amount of air passing over and around the food.

It is a further object and purpose of the present invention to provide a food cooking and heating apparatus with an air heating chamber having an improved design, thereby reducing breakdowns and required repairs.

SUMMARY OF THE INVENTION

In a food cooking and heating apparatus, an upper front door and a lower front door are juxtaposed opposite a rear door. The doors are attached to an outside cabinet through use of hinges. A continuous front gasket lies between the cabinet and the front doors and a continuous rear gasket lies between the rear door and the cabinet in order to create a sealed enclosure. Each door has a handle with a latch to secure the door when in the closed position.

The outside cabinet has parallel side walls and a top parallel to a bottom. The side walls, bottom, and doors consist of an inner shell and an outer shell and are filled with insulation.

A control panel is located above the front doors. The apparatus is mounted on castors so that it may be easily moved.

The food holding oven is located within the cabinet. The inside of the front doors and the inside of the rear door are the front and rear walls, respectively, of the oven. The oven has perforated side walls with rows of parallel angle supports extending inward. The angle supports slidably receive a plurality of food trays capable of holding a large number of food servings.

Food within the oven is cooked or heated by an air convection system which includes an air heating chamber. The air heating chamber, a substantially airtight enclosure, includes a blower operated by an electric motor. The motor and its associated wiring are outside of the air heating chamber, avoiding exposure to the heated air passing through the air heating convection system. A heating element within the air heating chamber is in the path of air as it is forced from the blower.

An inlet and an outlet in the air heating chamber are provided for the passage of air.

In the air heating chamber, air is drawn through the bottom of the blower and forced across the air heating chamber past the heating element, causing the air to be heated. The heated air is thereafter forced from the air heating chamber through the outlet into a passageway formed by a space between the cabinet side wall and perforated oven side wall. The perforations in the oven side wall are evenly spaced along the side of the oven allowing the heated air to be passed into and distributed throughout the food holding oven. The heated air distributed through the food holding oven thus heats the food by passing over the food holding trays. The air is thereafter forced from the oven through perforations in the other oven side wall into a passageway formed by a space between the cabinet side wall and the oven side wall. The forced air is thereafter returned to the air heating chamber through the inlet.

A thermostat within the air heating chamber monitors the temperature of the air within the oven. When the temperature drops below the point set on the control panel, a contact is closed and the heating element is turned on. At the same time, the blower operates at full speed, delivering the maximum amount of heated air to the oven. When the temperature of the air within the food holding oven reaches the selected point, the heating element is turned off and the blower speed is decreased.

BRIEF DESCRIPTION OF THE DRAWINGS

FIG. 5 is a section view taken along section line 5—5 of FIG. 3; and

FIG. 6 is a schematic diagram representing the circuits of the food cooking and heating apparatus shown in FIG. 1.

DETAILED DESCRIPTION OF THE PREFERRED EMBODIMENTS

Figure 1:
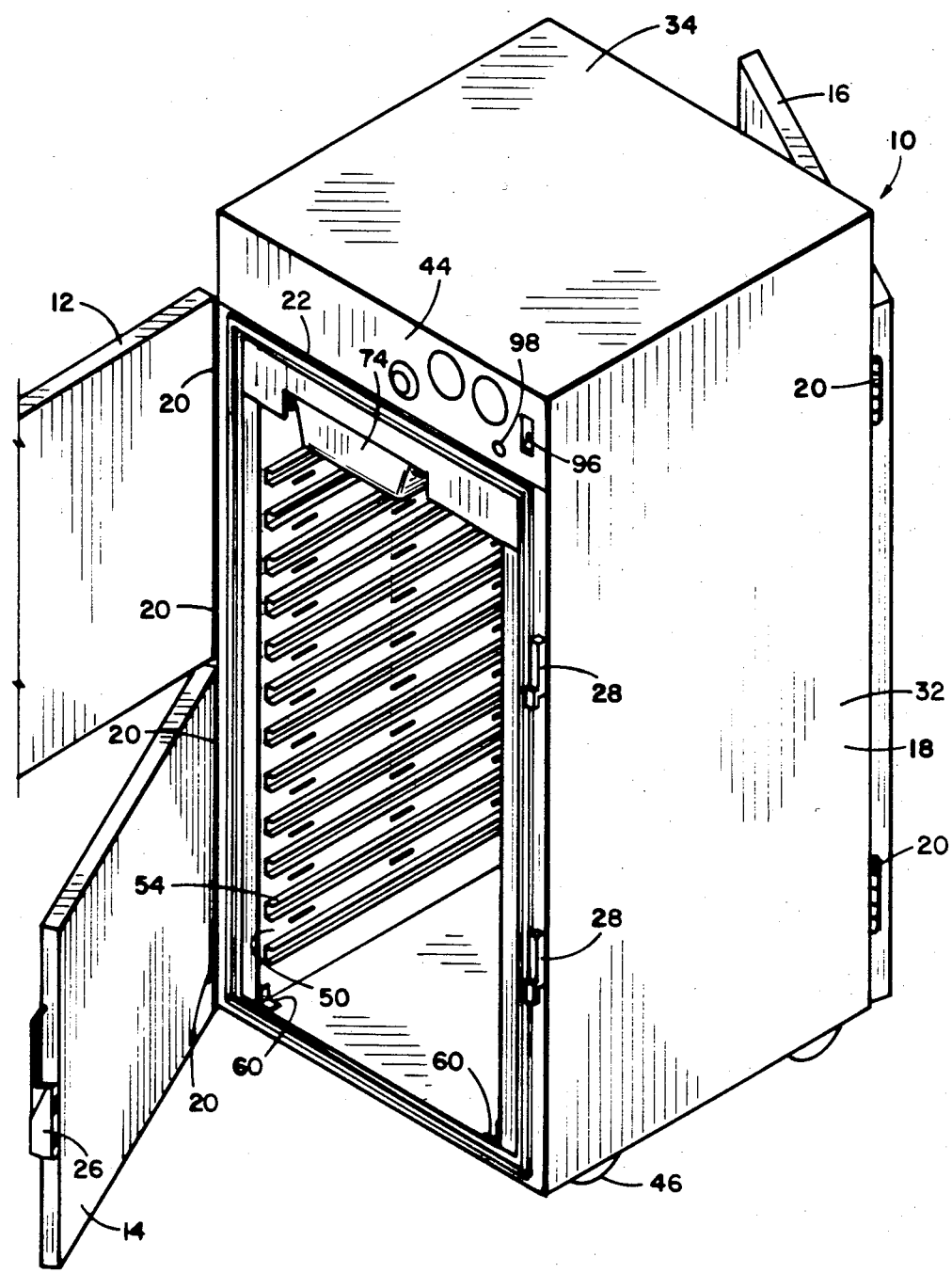
FIG. 1 is a view in perspective of a food cooking and heating apparatus constructed according to the present invention.

Referring to the drawings in detail, FIG. 1 is a perspective view of one embodiment of the food cooking and heating apparatus 10 of the present invention.

While only a single door is required for access, an upper front door 12 and a lower front door 14 are juxtaposed opposite a rear door 16 in the present embodiment. The upper front door 12 is shown in the open position in the front view of the apparatus seen in FIG. 2. The doors are attached to an outside cabinet 18 through use of hinges 20. A continuous front gasket 22 lies between the cabinet and the front doors 12 and 14 to create a sealed enclosure when the doors are closed. A continuous rear gasket 24 lies between the rear door 16 and the cabinet to create a sealed enclosure. In operation, the rear door 16 may be used to load food (not shown) into the apparatus. At serving time, either of the front doors may be opened to remove the food.

Each door has a handle 26 with a latch 28 to secure the door when in the closed position.

The outside cabinet has parallel side walls 30 and 32 and a top 34 parallel to a bottom 36. The side walls 30 and 32 and bottom 36 consist of an inner shell 38 and an outer shell 40 and are filled with fiberglass 42 or other insulation to improve heat retention qualities. Likewise, doors 12, 14, and 16 consist of an inner shell and an outer shell and are filled with insulation. In the present embodiment, the outside cabinet and doors are fabricated primarily from sheet metal; however, it should be recognized that other materials might be used.

A control panel 44, to be described in detail below, is located at the front of the apparatus 10 above doors 12 and 14.

Figure 2:
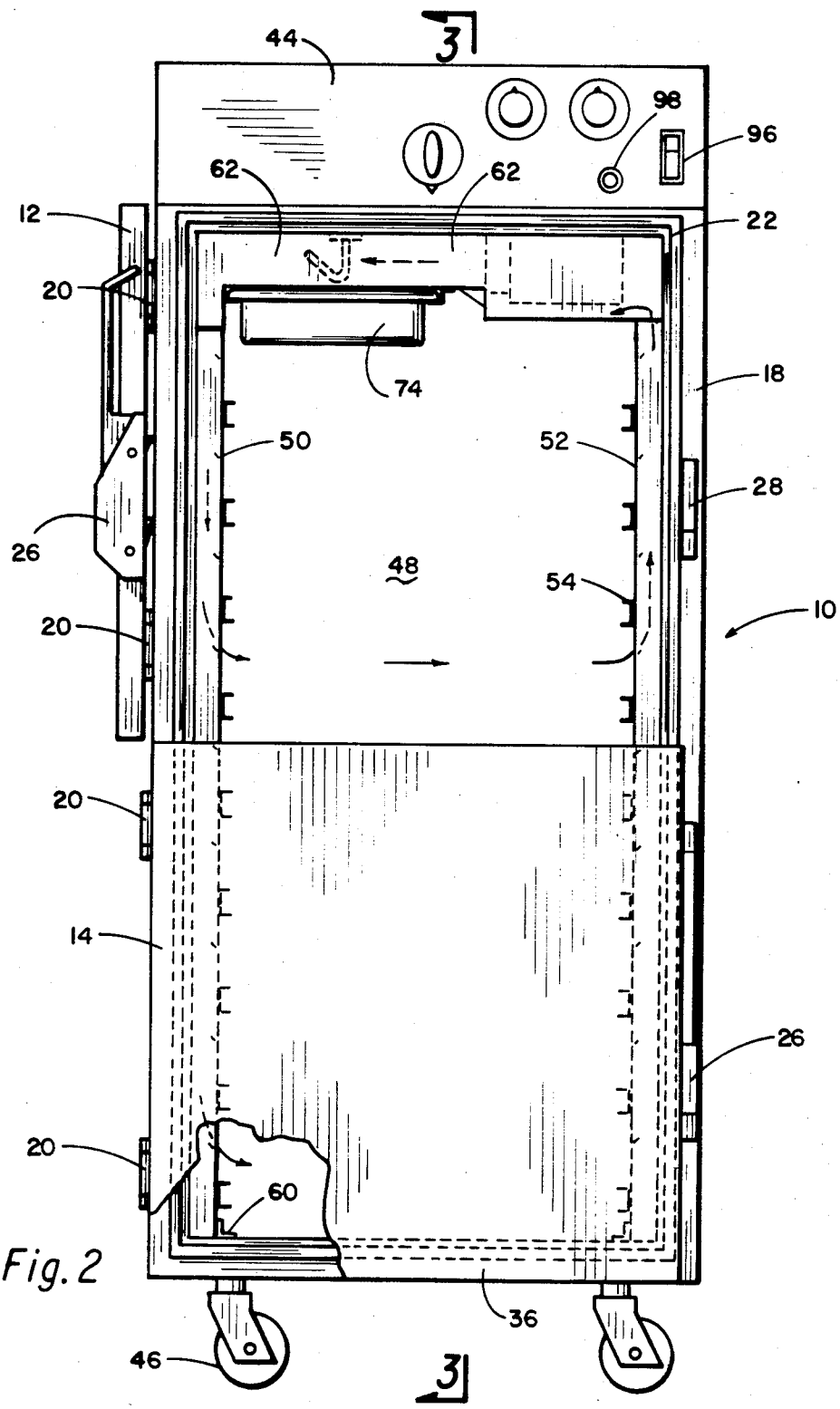
FIG. 2 is a front view of the cooking and heating apparatus shown in FIG. 1 with an upper front door in the open position and with a lower front door partially cut away to reveal the interior.
Figure 3:
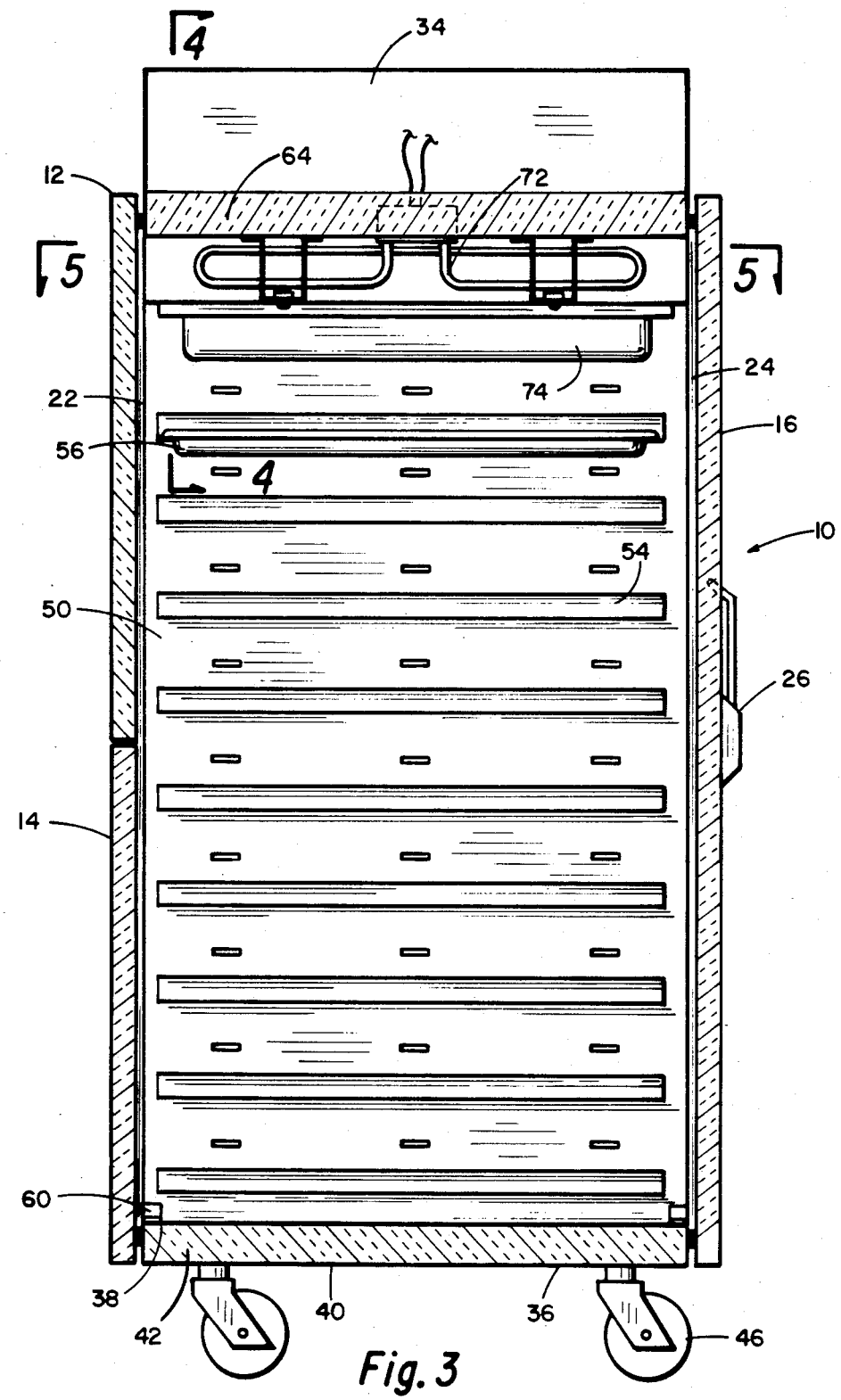
FIG. 3 is a section view taken along section line 3—3 of FIG. 2.

As best seen in the front view in FIG. 2 and the cutaway view in FIG. 3, the apparatus 10 is mounted on castors 46 so that it is portable.

Referring to FIGS. 1, 2, and 3, a food holding oven 48 is located within the cabinet 18. The inside of front doors 12 and 14 and the inside of rear door 16 are the front and rear walls, respectively, of the oven. As will be described, a relatively uniform temperature is maintained throughout the food holding oven. The oven has perforated side walls 50 and 52 with rows of parallel angle supports 54 extending inward. The angle supports slidably receive a plurality of food trays 56 capable of holding a large number of food servings. The oven side walls are held in place by clips 58 and L-brackets 60.

A typical use of the apparatus would involve opening rear door 16 and sliding a tray 56 with food thereon into the oven 48 on the angle supports 54. The rear door would be closed and, as hereinafter described, the food would be cooked or, if already cooked, maintained at serving temperature.

Figure 4:
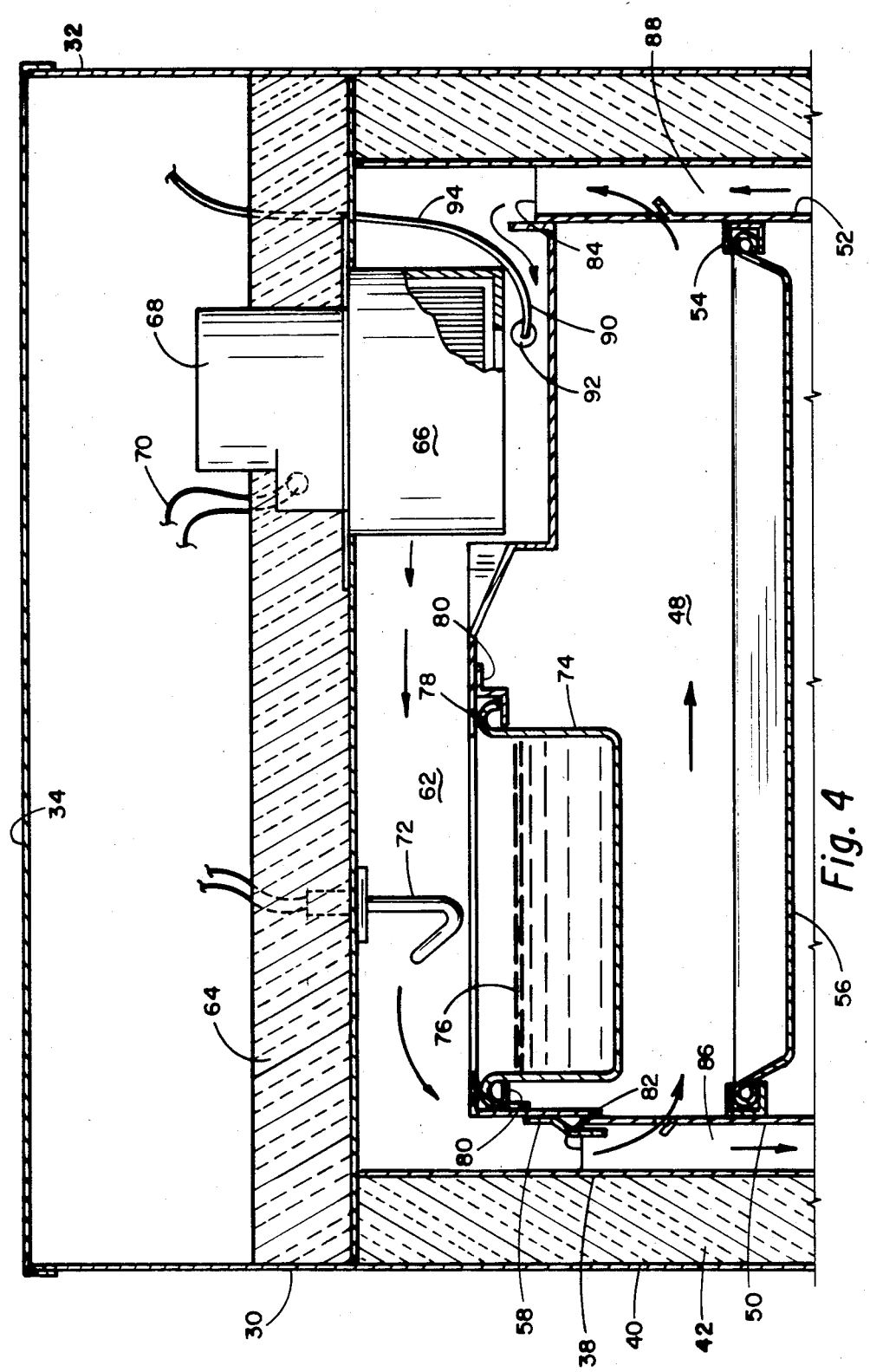
FIG. 4 is a section view taken along section line 4—4 of FIG. 3.

The food within the oven is cooked or heated by an air heating convection system which includes an air heating chamber 62 seen in FIG. 2 and in the enlarged view in FIG. 4. The arrows diagrammatically represent the path of air through the system. Above the air heating chamber 62 is a layer of fiberglass 64 or other insulation for heat retention purposes.

The air heating chamber 62, a substantially airtight enclosure with two openings to be described, includes a blower 66 operated by an electric motor 68. It should be noted that the motor and associated wiring 70 are outside of the air heating chamber 62. As will be appreciated, this avoids exposing the motor 68 and wiring 70 to the heated and sometimes grease-laden air passing through the air heating convection system. A heating element 72 within the air heating chamber is in the path of air as it is forced from the blower. An electric heating element is used in the present embodiment although other types may be employed.

Beneath the heating element 72 in an optional water tray 74. The surface 76 of water in the water pan is exposed to the air heating chamber. The sides of the water tray have overhanging lips 78 which slidably rest on tracks 80. In order to fill the water tray, the upper front door 12 or rear door 16 is opened and the tray slid out. It should be stressed that the water tray is optional. Because the apparatus operates to minimize the drying effect on the food, the water tray 74 is not required to add moisture back into the atmosphere. The water tray might, for instance, be used to create an extra moist food product.

A pair of openings, outlet 82 and inlet 84 in the air heating chamber 62 are provided for passage of air as herein described.

As shown by the arrows, air is drawn through the bottom of the blower 66 and forced across the air heating chamber past heating element 72, causing the air to be heated. The heated air is thereafter forced from the air heating chamber 62 through outlet 82 into a passageway 86 formed by a space between the cabinet side wall 30 and the perforated oven side wall 50. The perforations in the oven side wall are evenly spaced along the side of the oven 48, allowing the heated air to pass into and be distributed throughout the food holding oven.

The heated air distributed throughout the food holding oven thus heats the food therein by passing over the food holding trays 56. The air is thereafter forced from the oven through the perforations in the oven side wall 52 into a passageway 88 formed by a space between the cabinet side wall 32 and the oven side wall 52. The forced air is thereafter returned to the air heating chamber 62 through inlet 84.

The temperature of the air within the food holding oven is monitored by a thermostat 90. Placement of the thermostat within the air heating chamber 62 in the path of the air forced from the oven is important so that an accurate reading of the temperature within the oven can be taken. The thermostat, which operates in a conventional manner, contains a bulb 92 with fluid (not shown) therein connected to a contact by a capillary tube 94. When the temperature rises, pressure of the fluid mechanically opens the contact at a selected temperature point. The temperature is set by means of a control on the face of the control panel 44.

A cut-away top view in FIG. 5 of the air heating chamber 62 shows the circulation of air through the air heating convection system.

Returning to a consideration of FIGS. 1 and 2, the control panel includes an on-off switch 96 and a pilot light 98. The apparatus is connected to normal electrical service by means of an electrical cord (not shown).

The blower 66 changes speed during the operation of the apparatus 10. As previously described, the thermostat 90 monitors the temperature of the air within the oven. When the temperature drops below the point set on the control panel, the contact is closed and the heating element 72 is turned on. At the same time, the blower operates at full speed, increasing the volume of air circulating to its maximum for quick recovery of the temperature. When the temperature of the air has reached the selected point, the heating element is turned off and the blower speed decreased.

When the temperature of the air has reached the selected point, the heating element is turned off and the blower speed decreased. It is important that the blower not be completely turned off when the selected temperature is reached. With the blower operating at low speed, a small amount of air will be circulated within the system, allowing the thermostat 90 to obtain an accurate reading of the temperature of the air within the food holding oven.

FIG. 6, a schematic diagram of the air heating convection system circuits of the apparatus 10, shows blower motor speed control 100 within a dotted line box. Alternating current electrical service 102 with ground 104 is connected to the apparatus 10. A high limit bimetallic safety switch 106 is provided in the event of malfunction of the apparatus and is triggered by high temperatures. On-off switch 96 is connected with pilot light 98 which is mounted on the control panel.

As previously described, heating element 72 is controlled by thermostat 90, which opens and closes contact 110 in response to the temperature. When the heating element is on, pilot light 112 is lighted.

The coil of relay 114 is energized by the thermostat 90. As seen in FIG. 6, switch 116 has two positions. In the position shown in FIG. 6, with the voltage passing through the blower motor speed control 100, resistors 118 and 120 in series and adjustable resistor 122 are used to slow the speed of the blower motor.

Resistor 124 and capacitor 126, in series, prevent switch 128 from prefiring. Capacitor 130 and choke 132 are provided for noise reduction.

Whereas, the present invention has been described in particular relation to the drawings attached hereto, it should be understood that other and further modifications, apart from those shown or suggested herein, may be made within the spirit and scope of this invention.

What is claimed is:

1. A food cooking and heating apparatus which comprises: a food holding oven having at least one front door movable between open and closed positions for access to the interior thereof; an air heating chamber having an inlet and an outlet; air heating means within said heating chamber; an intake passageway to conduct heated air from the outlet of said air heating chamber to an inlet of said food holding oven; an exhaust passageway to conduct air from said food holding oven to said air heating chamber; air temperature sensing means within said air heating chamber; a closed air convection system including blower means in said heating chamber for circulating air past said heating means, through said intake passageway, through said food holding oven, through said exhaust passageway and back to said air heating chamber; variable air volume means to vary the volume of air passing through said closed air convection system; means for selecting a desired temperature to be maintained within said oven and located outside of said closed air convection system; and a circuit for comparing said sensed temperature to said selected temperature, causing said air heating means to operate and said variable air volume means to increase when a difference in temperature exists and causing said air heating means to cease and the said variable air volume means to decrease said air volume to a minimum greater than zero when said selected temperature is reached.

2. A food cooking and heating apparatus which comprises: a food holding oven having at least one front door movable between open and closed positions for access to the interior thereof; an air heating chamber having an inlet and an outlet; air heating means within said heating chamber; an intake passageway to conduct heated air from the outlet of said air heating chamber to an inlet of said food holding oven; an exhaust passageway to conduct air from said food holding oven to said air heating chamber; air temperature sensing means within said air heating chamber; a closed air convection system including variable speed blower means in said heating chamber for circulating air past said heating means, through said intake passageway, through said food holding oven, through said exhaust passageway and back to said air heating chamber; means for selecting a desired temperature to be maintained within said oven and located outside of said closed air convection system; and a circuit for comparing said sensed temperature to said selected temperature, causing said air heating means to operate and the speed of said blower means to increase when a difference in temperature exists and causing said air heating means to cease and the speed of said blower means to decrease to a minimum speed greater than zero when said selected temperature is reached.

3. A food cooking and heating apparatus as set forth in claim 2 wherein said food holding oven includes at least one rear door movable between open and closed positions for access to the interior thereof.

4. A food cooking and heating apparatus as set forth in claim 2 including wheel means.

5. A food cooking and heating apparatus as set forth in claim 2 including a timer circuit wherein the food holding oven may be heated to a desired temperature for a period of time to cook said food and then maintained at a desired serving temperature.

6. A food cooking and heating apparatus as set forth in claim 2 including a removable water pan wherein water in said pan is exposed to said air heating chamber.

7. A food cooking and heating apparatus as set forth in claim 2 including removable food holding pans within said food holding chamber.

* * * * *